Nov. 14, 1939.   W. J. OESTERLEIN   2,179,561
DYNAMO-ELECTRIC MACHINERY
Filed Dec. 17, 1936   5 Sheets-Sheet 1

INVENTOR.
William J. Oesterlein
BY John W. Michael
ATTORNEY.

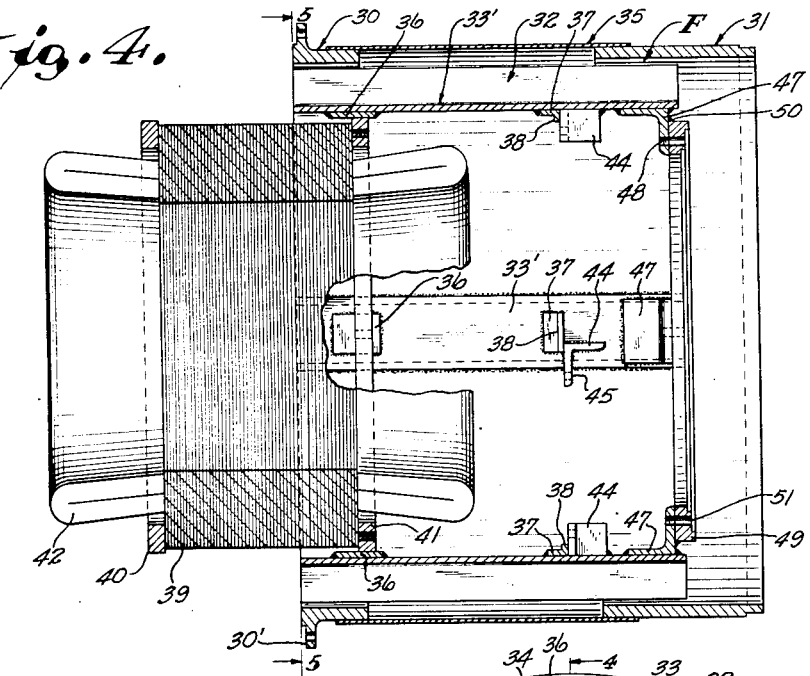
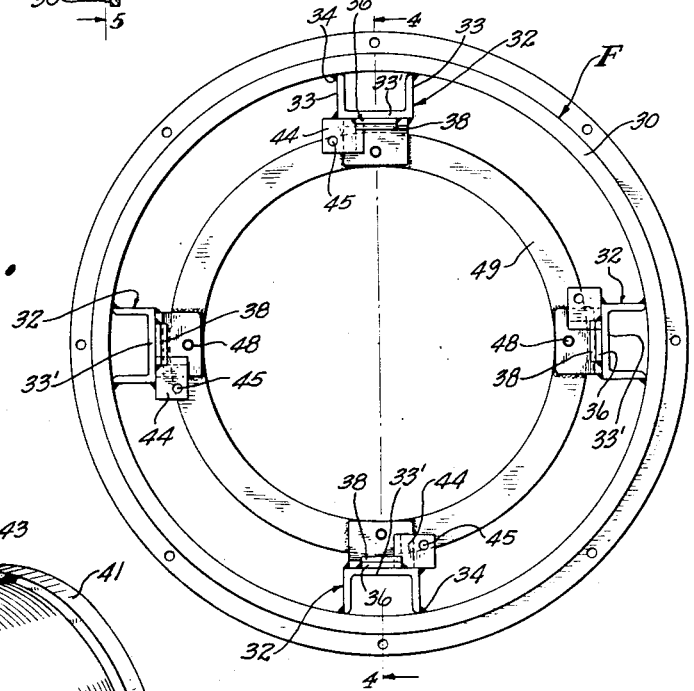
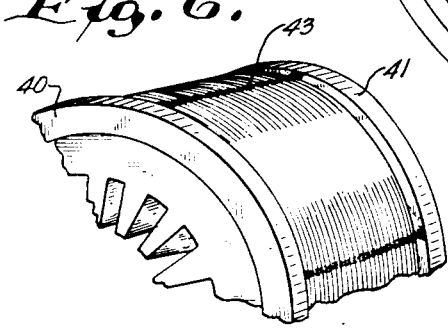

Nov. 14, 1939.  W. J. OESTERLEIN  2,179,561
DYNAMO-ELECTRIC MACHINERY
Filed Dec. 17, 1936  5 Sheets—Sheet 5
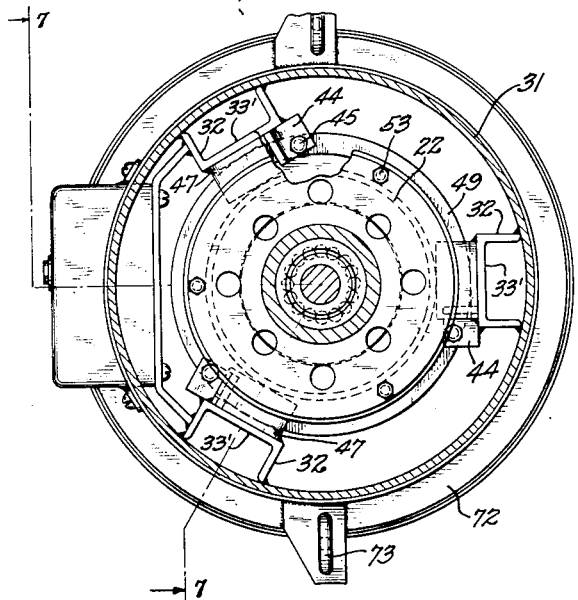
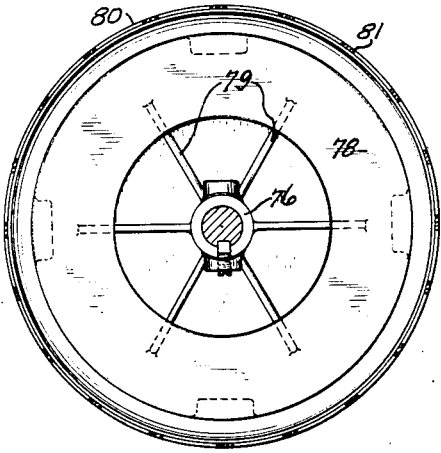
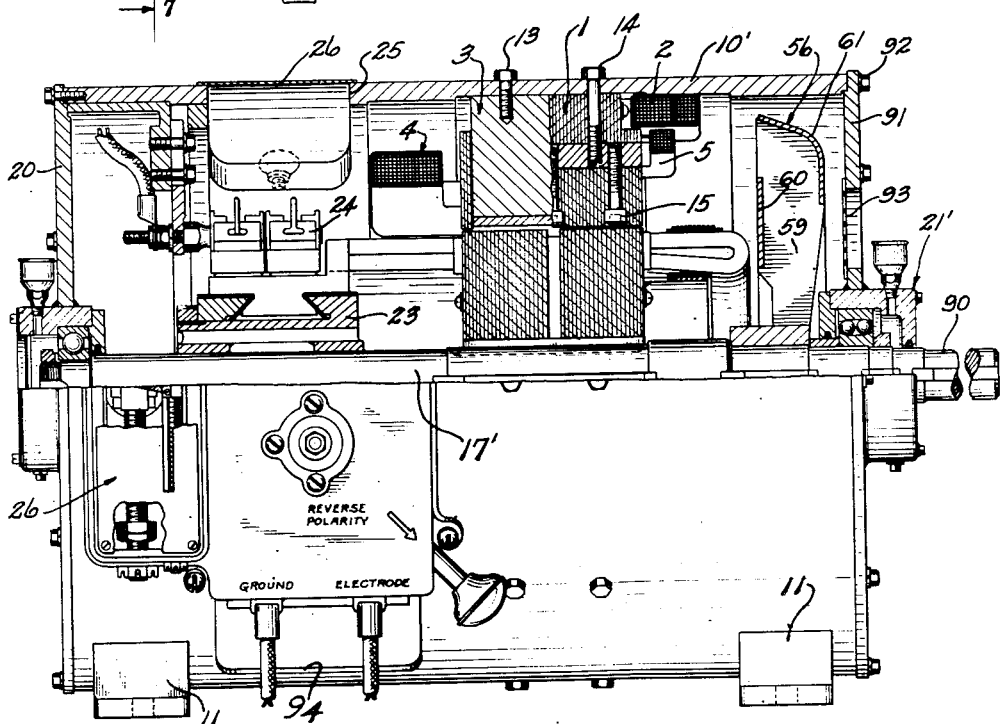
INVENTOR.
William J. Oesterlein
BY John W. Michael
ATTORNEY.

Patented Nov. 14, 1939

2,179,561

UNITED STATES PATENT OFFICE 2,179,561

DYNAMO-ELECTRIC MACHINERY

William J. Oesterlein, Milwaukee, Wis., assignor to Harnischfeger Corporation, Milwaukee, Wis., a corporation of Wisconsin Application December 17, 1936, Serial No. 116,268

6 Claims. (Cl. 171—123)

This invention relates to an improvement in dynamo-electric machinery particularly designed for generating electric currents suitable for use in electric arc welding.

One of the objects of the invention is to provide a machine of this character which is so organized structurally as to insure effective ventilation or cooling of the various instrumentalities of the machine which become heated during operation and to accomplish this with an extremely simple and compact construction.

Another object of the invention is to provide an improved frame or stator mounting for the motor of a machine of the character here contemplated, the arrangement being such as to simplify the manufacture and assembly of the component parts, insure accurate and precise relative positioning of the stator and rotor to obtain the correct air gap and operating clearances between these relative rotating parts and to accomplish this in a compact and simplified construction, one in which the overall dimensions of the machine are substantially reduced.

Another object of the invention is to embody a machine of the character specified and having the advantages enumerated in a construction susceptible of manufacture at a comparatively low cost.

Other objects and advantages reside in certain novel features of the construction, arrangement and combination of parts which will be hereinafter more fully described and particularly pointed out in the appended claims, reference being had to the accompanying drawings forming part of this specification, and in which:

Figure 1 is a view partly in side elevation and partly in longitudinal radial cross section showing a motor generator set of the horizontal type embodying the present invention;

Figures 2 and 3 are views in transverse vertical cross section taken on lines 2—2 and 3—3, respectively, of Figure 1 and looking in the direction of the arrows;

Figure 4 is a view partly in longitudinal vertical cross section and partly in elevation illustrating how the stator core assembly and its windings are assembled with the motor frame;

Figure 5 is an end elevational view of the motor frame as viewed from line 5—5 of Figure 4;

Figure 6 is a fragmentary perspective view illustrating how the laminations of the stator core are welded together and to the end rings thereof;

Figure 1:
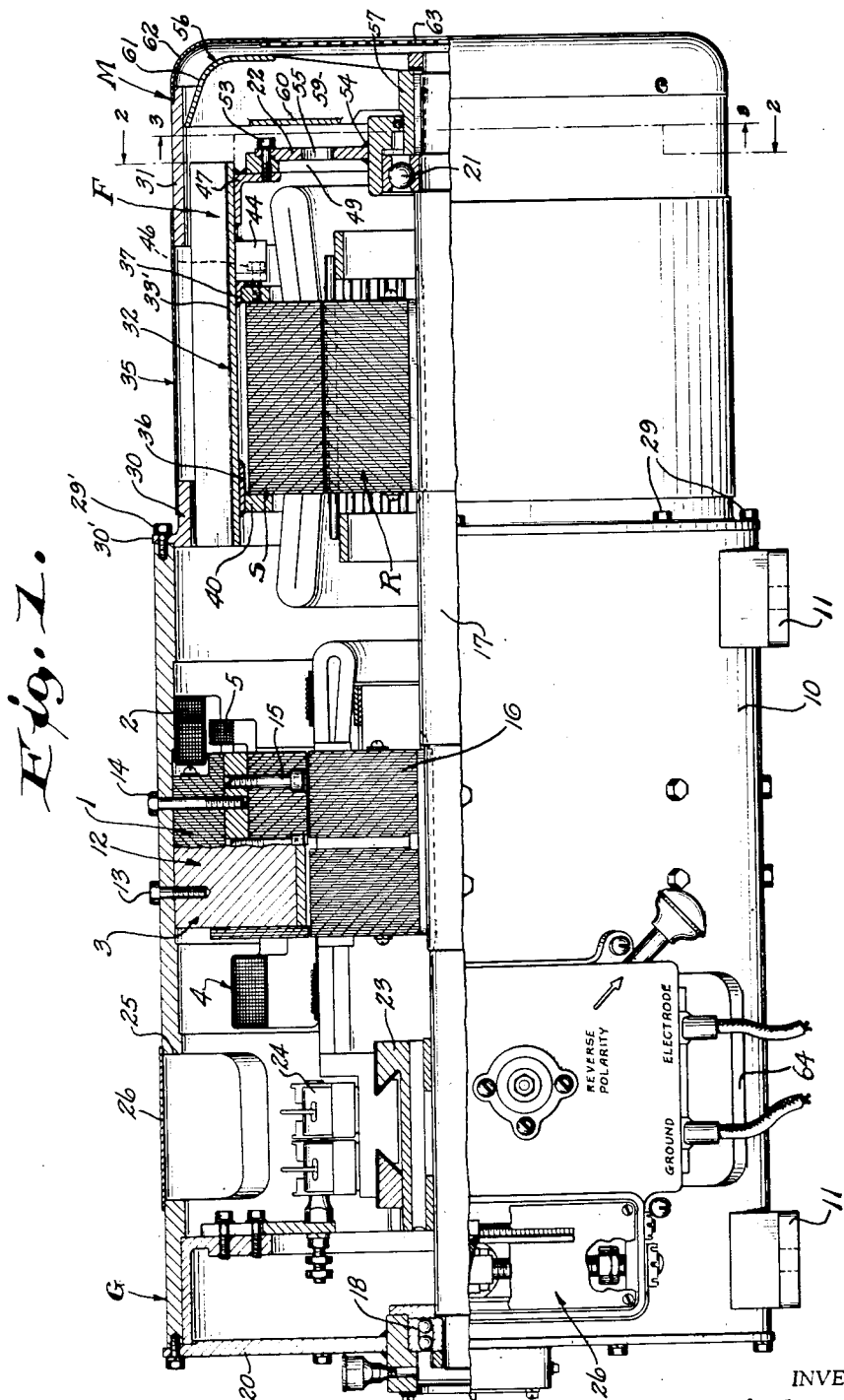
Figure 7:
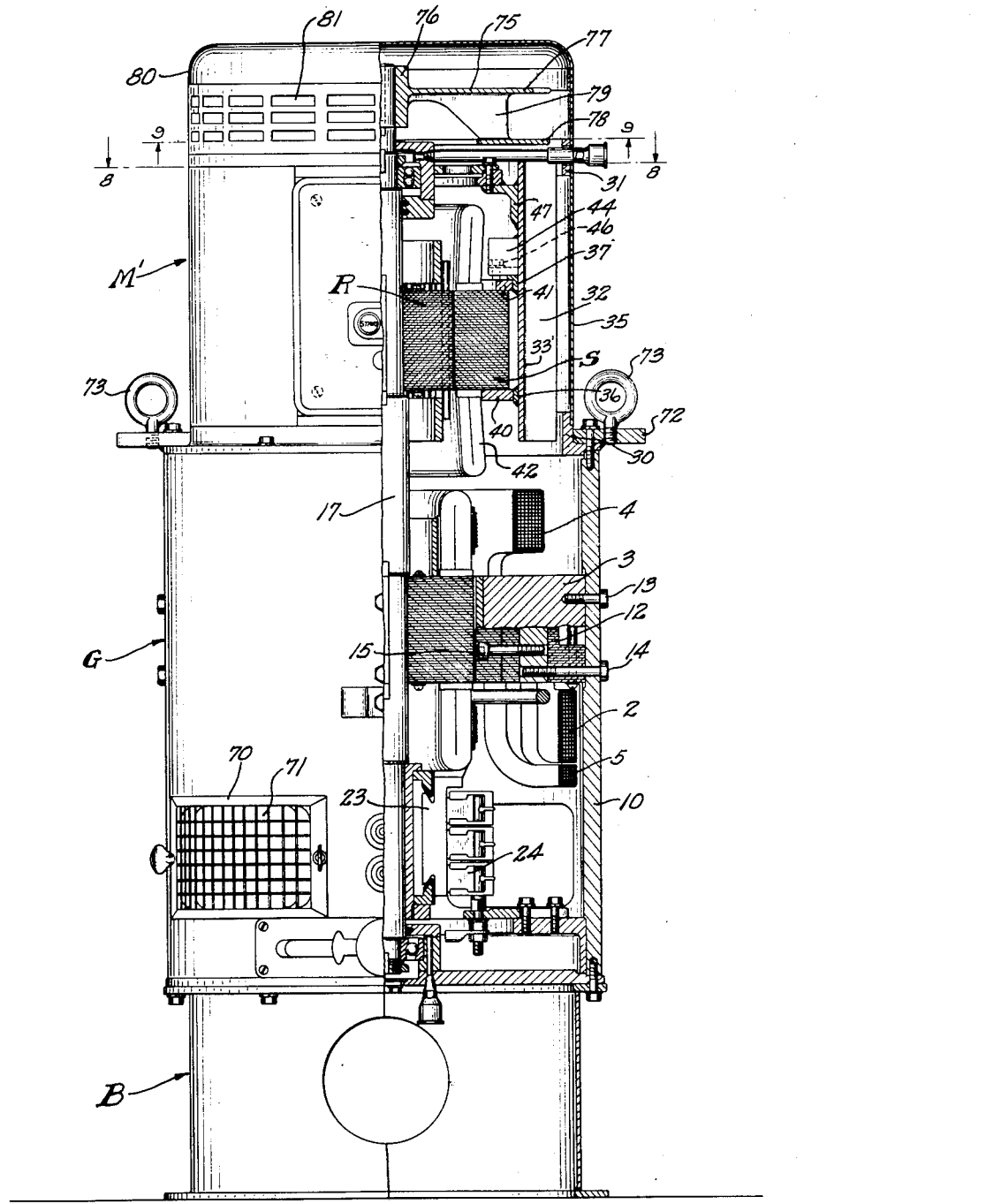
Figure 7 is a view partly in front elevation and partly in radial vertical section showing a motor generator set of the vertical type embodying the present invention.

Figures 8 and 9 are views in horizontal cross section taken on lines 8—8 and 9—9, respectively, of Figure 7 and looking in the direction of the arrows; and Figure 10 is a view similar to Figure 1 but showing certain features of the invention embodied in a generator of the type adapted to be driven from a separate motor or other source of power.

Referring to the drawings and more particularly to Figures 1 to 6, inclusive, it will be seen that the motor-generator set there shown is of the horizontal type and comprises a generator designated generally at G and a motor designated generally at M.

The generator G comprises a main casing 10 having the general form of a horizontally disposed metal cylinder which may be bolted to a foundation, a wheeled frame or other suitable support by means of apertured feet 11 welded to the exterior of the casing 10, and provided at the opposite sides of the lower portions thereof adjacent the ends of the casing. The parts which go to make up the field of the generator are designated generally at 12 and are secured in position by suitable screws 13, 14 and 15. The field assembly is, as the drawing indicates, designed to meet the requirements of the use to which the machine is put and hence includes a main pole assembly 1, field coil assembly 2, interpoles 3, stabilizer coil 4, and short circuited coil 5, but as its construction per se forms no part of the present invention it will not be further described in detail. The armature of the generator is designated at 16 and is supported upon an armature shaft 17. This single shaft 17 serves as the armature shaft for both the generator and the motor and for this purpose extends the full length of the machine. One end is rotatably mounted in a bearing 18 supported by the end head 20 bolted to the outer end of the generator casing 10. The other end of the shaft is journaled in a ball bearing assembly 21 supported in a motor end head 22 which is constructed and combined with the motor frame, as will hereinafter more clearly appear.

The commutator of the generator is designated at 23. Cooperable therewith is the brush rocker assembly 24. Access to the brushes may be had through a hand hole 25 which is ordinarily closed by a removable hand hole cover. A suitable control box assembly 26 is secured to the generator casing 10.

The motor M comprises generally a stator S and a rotor R, the rotor being fixed to and rotatable with the common shaft 17 for the motor and generator.

The stator S comprises a stator frame designated generally at F and made up of longitudinally spaced outer frame members 30 and 31. The frame members 30 and 31 are of annular form and are connected to each other by a plurality of longitudinally extending channels 32. These channels 32 face outwardly and are uniformly angularly spaced around the inside of the frame members. At their ends the side flanges 33 of the channels are welded to the frame members 30 and 31 as indicated at 34 in Figure 5. The space between the frame members 30 and 31 is closed by a band-like cover member 35 which may be detachably secured to the frame members in any suitable fashion. The frame member 30 is provided with an outwardly directed annular flange 30' designed to interfit with the adjacent end of the generator casing 10 and to be secured thereto by means of bolts 29'.

To the inner faces of the body portions 33' of the channels 32 supporting pads 36 and 37 are welded. There is one such pad 36 and one such pad 37 for each supporting channel, these pads being longitudinally spaced as clearly shown in Figure 4. The inner faces of these pads are accurately machined to provide seats or supports for the end rings of the stator core assembly. Moreover, the pads 37 have integral inwardly directed and properly machined flanges or stops 38.

The stator core assembly is made up of laminations 39, rings 40 and 41 and windings 42. Welds 43 are laid across the laminations at spaced angular points thereabout as illustrated in Figure 6 and also interconnect the laminations with the end rings 40 and 41. The outer surfaces of the end rings 40 and 41 are properly machined.

This structure admits of the assembly of the laminations 39, rings 40 and 41 and windings 42 as a unit and then the assembly of this unit with the previously fabricated stator frame. As illustrated in Figure 4, the stator core assembly is slid as a unit into the previously constructed stator frame assembly until the stator ring 41 is supported on the bearing pads 37 and in abutting relation to the stop flanges 38 whereas the stator ring 40 is engaged and supported with the bearing pads 36, in the manner clearly illustrated in Figure 1.

To secure the stator assembly in this position anchoring lugs 44 are welded to the channels 32 adjacent each bearing pad 37, one flange of each lug 44 being apertured as at 45. Screws 46 coact with the apertured flanges of the lugs 44 and are threaded into the adjacent stator ring 41 to releasably secure the stator core assembly in position on the stator frame.

Angular mounting lugs 47 are also welded to the inner faces of the channels 32 and have their inwardly directed flanges or portions provided with threaded openings 48. A mounting ring 49 is welded as at 50 to the inwardly directed flanges of the mounting lugs 47 and has openings 51 registering with the threaded openings 48 of the lugs 47. The motor end head 22 has its outer periphery interlocked with the mounting ring 49 by a double rabbet joint or engagement and is securely fastened to the mounting ring and to the mounting lugs by screws 53. The central opening of this end head 52 accommodates the bearing 21 and is welded to the outer member thereof as indicated at 54. A plurality of angularly spaced openings 55 are provided in the body of the end head and serve a purpose which will hereinafter more clearly appear.

The shaft 17 projects outwardly beyond the bearing 21 and on the projecting portion thereof a fan designated generally at 56 is secured so as to be rotated with the shaft 17. As illustrated to advantage in Figures 1 and 3, the fan 56 comprises a hub 57 keyed as at 58 to the shaft 17. Blades 59 are cast integral with the hub 57 and extend radially therefrom, the blades enlarging in their width as they extend outwardly from the hub, and having their air impelling surfaces disposed in planes extending longitudinally of the shaft 17. A flat disc-like web 60 is cast integral with the blades and extends across their inner edges but has a radial extent substantially less than that of the fan blades, so that the spaces between the inner edges of the blades are open adjacent their inner as well as their outer ends. Toward their outer ends the outer edges of the fan blades slope inwardly towards the inner edges thereof and these sloping portions of the outer edges as well as the portions thereof which lie immediately adjacent thereto are connected by a curved web 61 which is also cast integral with the blades and, which by virtue of its formation, exerts a directional influence over the currents of air set up by the rotating fan blades.

The inner portion of the fan operates within the stator frame member 31. The enclosure of the fan is completed by means of a fan guard 62 detachably connected to the stator frame member 31 and provided centrally with a grillwork or perforation 63.

The fan 56, the stator frame construction and the perforated motor end head 22 form part of a cooling or ventilating structure for the motor. When the motor is running the fan 56 is rotated with the shaft 17 and the fan blades together with the discs 60 and 61 cause the air to be drawn into the perforations of the fan guard, in between the discs 60 and 61 and longitudinally of the stator frame. The channels 32 provided at angular intervals about the stator frame define longitudinal air passages which have been found to insure flow of a substantial portion of the air displaced by the fan longitudinally through the motor and thence on through the generator. Other portions of the air displaced by the fan flows in between the channels 37 and over the stator winding, laminations and over the rotor and recirculates through the openings 55 of the motor end head. The air that flows on through the generator travels out through air discharge openings 64.

Referring now to Figures 7, 8 and 9, the invention is shown embodied in a vertical type of motor generator set wherein the generator is designated generally at G', the motor at M' and a base structure at B. The generator comprises exactly the same elements in the same relation as the generator G and corresponding parts have been correspondingly numbered. The only difference resides in the fact that the generator casing 10 is provided with an air inlet 70 having a grill-like cover 71. The motor M' is also substantially the same as the motor M of Figure 1 except that it is vertically arranged and placed on top of the generator. In addition to having its flange bolted to the generator casing, it is provided with a suspension ring 72 equipped with eyelets 73 to adapt the machine for handling by a hoist or the like. The only other departure, aside from type, in the machine shown in Figures 7 to 9 from that shown in Figures 1 to 6 is in the fan employed to cause air currents to travel over the parts of the motor and generator which are heated during operation and the particular way in which the air is drawn into the machine and discharged therefrom. In the motor the control of ventilation is had in the same manner as before and all other particulars. On the upper end of the shaft 17 a fan 75 is secured. This fan consists of a hub 76 fastened to the upper end of the shaft. An upper body plate 77, a lower plate 78 and fan blades 79 connecting the plates 77 and 78, the hub, plates and blades also being cast integral. The fan guard 80 which surrounds the fan and forms an extension of the motor casing is provided with openings 81 entirely around its periphery. With this construction, as the fan is rotated its blades throw the air radially out through the openings 81 and thus causes the air to be drawn in through the openings 70 over the elements of the generator and over the rotor and stator and through the longitudinal passages of the stator frame, thereby effectively cooling the parts in which heat is generated. The motor construction has the same advantages pertaining to convenience and simplicity of production in assembly as in the other embodiment.

In Figure 10 a generator alone is shown and that is to say one which does not have a motor combined therewith at the time of production but which is capable of being driven by a separate motor or some other source of power. The generator there shown corresponds in all substantial respects with that shown in Figure 1 and hereinbefore described except that the shaft designated at 17' is somewhat shorter and has its projecting end 90 adapted to connect with suitable source of power. The portion of the shaft adjacent its projecting end is rotatably supported in a bearing 21' carried by an end head 91 which is bolted as at 92 to the casing 10' of the generator. Air is circulated over the operating parts of the generator by the fan 56 of identical construction of that shown in Figure 1 hereinbefore described, the fan drawing the air in through the grill-like inlet opening 93 in the end head 91 circulating it over the parts of the generator and effecting its discharge through the outlet 94.

From the foregoing it will be seen that in both the horizontal and vertical type of motor generator set the motor has a unitary stator frame assembly with which a unitary stator core assembly is conveniently assembled. The advantages of economic manufacture on an efficient and large scale are realized and yet provision is made for proper cooling or ventilation of the motor and generator. In particular, the channels of the stator frame assembly not only well serve their function as an element of the frame but provide longitudinal passages which insure a longitudinal flow of a substantial portion of the air currents set up by the fan. The fan construction in both designs is susceptible of compact and simple organization with the machine and yet is effective to induce the proper air flow. The air currents set up by the rotating fan blades are given their proper direction by the webs cast integral therewith and extending circumferentially thereof.

In the forms of the invention shown in Figures 1 to 6 and 10, the sloping webs of the fans coact with the special stator frame structure to insure an adequate longitudinal flow of air through the machine. In the form shown in Figures 1 to 5, this feature is had and in addition air is circulated through the openings 55 of the motor and head 22 and consequently over the adjacent elements of the motor.

Figure 2:
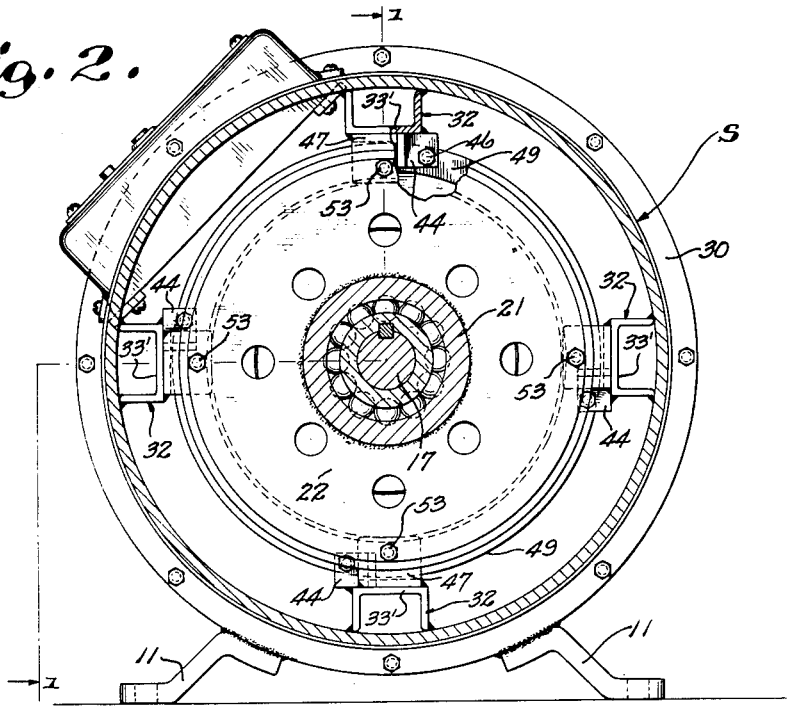
Figure 3:
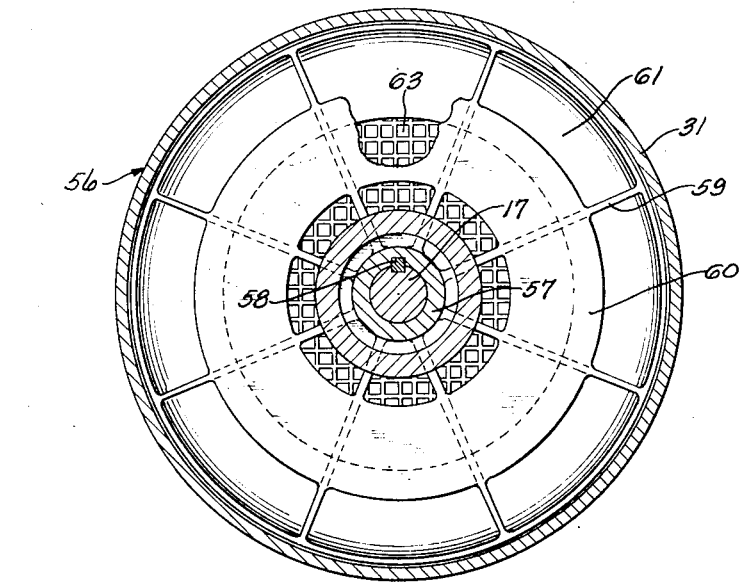

While the channels, such as the channels 32, have been described as uniformly, angularly spaced, such spacing is not essential nor is it resorted to in all instances. Obviously, where conditions make it desirable, this angular spacing of the channels may be varied. Then again, the channels may be placed on a 45° angle instead of being disposed as illustrated in Figure 2. Also the starter box shown in Figure 2 may be vertically disposed if desired.

While I have shown and described several constructions in which the invention may be advantageously embodied, it is to be understood that the particular constructions shown have been selected merely for the purpose of illustration or example and that various changes in the size, shape and arrangement of the parts may be made without departing from the spirit of the invention or the scope of the subjoined claims.

The invention claimed is:

1. A dynamo-electric machine of the character described comprising a stator, said stator having a frame made up of annular frame members, a plurality of angularly spaced outwardly facing channels extending between said frame members and disposed on the inside thereof, means for fastening the channels to the frame members, a unitary stator core assembly supported on said channels, means for releasably securing said core assembly in position, a rotor, a shaft for said rotor, means for supporting the shaft for rotation including a bearing, a motor end head carrying said bearing, a mounting ring with which the motor end head is interfitted, lugs carried by the channels and with which the mounting ring is engageable and secured, and fastening devices for securing the motor end head to the mounting ring and to said lugs.

2. A dynamo-electric machine of the character described comprising a stator frame including longitudinally spaced annular frame members, angularly spaced connecting members between said frame members and also acting to provide longitudinal air passages through the stator frame, a cover enclosing the frame members, a stator core assembly supported by said connecting members, an end head supported adjacent one end of said stator frame and having a plurality of openings in its body portion, a rotor cooperable with said stator core assembly, a shaft supporting said rotor and projecting beyond said end head, and a fan fixed to the projecting portion of said shaft and having outwardly extending blades and circumferentially extending webs connected with inner and outer edges of the blades, said webs having a transverse extent substantially less than that of the blades, the outer web sloping inwardly, whereby air is forced through the longitudinal passages and is also circulated through the openings of said end head.

3. A dynamo-electric machine of the character described comprising a unitary stator frame assembly made up of a plurality of longitudinally extending and angularly spaced members provided with inwardly facing bearing pads, means for maintaining said members in proper relative position with respect to each other, a unitary stator core assembly having rings, portions of the outer peripheries of which are engageable with said bearing pads whereby the stator core assembly is supported on the frame, means cooperable with the stator core assembly and the frame for securing the stator core assembly in position with its rings engaging the bearing pads of the frame, and a rotor cooperable with the stator core assembly.

4. A dynamo-electric machine of the character described comprising a stator and a rotor, said stator having a frame made up of longitudinally spaced annular frame members, a plurality of angularly spaced outwardly facing channels extending between said frame members and disposed on the inside thereof, said frame members overlapping and engaging the end portions of said channels, means for directly fastening the end portions of the channels to the frame members, a cover for enclosing the space between the frame members, a stator core assembly supported by and releasably secured to said channels, and air impelling means actuated by the rotor for forcing air currents through said channels and over the parts of the rotor and stator.

5. A dynamo-electric machine of the character described comprising a stator and a rotor, said stator having a frame made up of longitudinally spaced annular frame members, a plurality of angularly spaced outwardly facing channels extending between said frame members, said frame members overlapping and engaging the end portions of said channels, means for directly fastening the channels to the end portions of the frame members, inwardly facing bearing pads on the inner portions of the channels and a unitary stator core assembly having end rings secured thereto, portions of the peripheries of the end rings being engaged with and supported on the inner faces of said bearing pads, and means for releasably securing the core assembly in the position in which said rings are supported by said pads.

6. A dynamo-electric machine of the character described comprising a stator and a rotor, said stator having a frame made up of longitudinally spaced annular frame members, a plurality of angularly spaced outwardly facing channels extending between said frame members and disposed on the inside thereof, said frame members overlapping and engaging the end portions of said channels, means for securing the channels to the frame members, spaced sets of inwardly facing bearing pads carried by the channels, one of said pads having inwardly directed shoulders, fixed anchoring lugs adjacent said shoulders, a unitary core assembly having end rings, portions of the peripheries of the end rings being engaged with and supported on said pads, one of said end rings having its lateral face abutting the shoulders of one set of pads, and fastening devices cooperable with said lugs and the adjacent end ring for releasably securing the stator core assembly in position.

WILLIAM J. OESTERLEIN.